Oct. 29, 1968     S. A. O. WIRFELT     3,407,467

CUTTING INSERT FOR CHIP CUTTING MACHINING

Filed May 24, 1967

United States Patent Office 3,407,467
Patented Oct. 29, 1968

3,407,467
CUTTING INSERT FOR CHIP CUTTING
MACHINING
Sven Axel Olof Wirfelt, Sandviken, Sweden, assignor to
Sandvikens Jernverks AB, Sandviken, Sweden, a corporation of Sweden
Filed May 24, 1967, Ser. No. 640,967
Claims priority, application Sweden, June 1, 1966,
7,443/66; Apr. 3, 1967, 4,561/67
3 Claims. (Cl. 29—95)

ABSTRACT OF THE DISCLOSURE

A cutting insert having a primary chip breaker in the form of a groove along a cutting edge of the insert, and a secondary chip breaker situated in a cutting corner and formed by a raised portion within the extension of the primary chip breaker above the level of the latter and at some distance from the edge of said corner.

---

The present invention relates to a cutting insert for chip cutting machining of metallic work pieces, the insert being adapted to be clamped in a tool. The insert is of the type having a chip breaker formed as a groove along a cutting edge.

In inserts of this kind there have been difficulties in performing rough and finish machining with the same insert, because if the chip breaker is adapted for rough machining, it will not break the thin chips that arise in finishing, the chips forming long threads which get entangled in the machine disturbing the operation thereof.

The invention solves this problem by means of a secondary chip breaker besides the usual main chip breaker. The secondary chip breaker is situated in the cutting corner and is formed by a raised portion rising above the level of the main chip breaker and situated at a distance from the edge of the corner. The advantage of this is that the same insert and the same set up of the insert can be used for as well roughing as finishing cutting, thus, improving the accuracy of the machining, and saving work for switching inserts.

Figure 1:
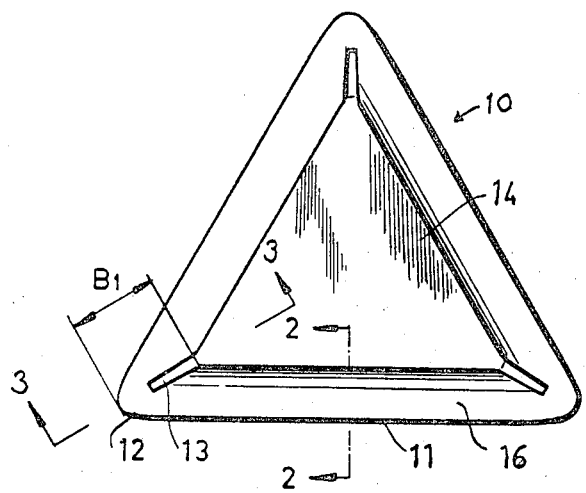

The invention is closer described in the following specification with appended drawing showing:

FIG. 1, an elevational view of a cutting insert according to the invention.

Figure 2:
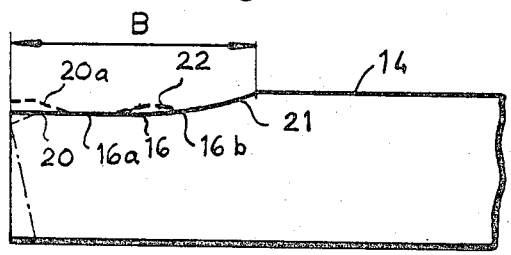

FIG. 2, a section on the line 2—2 in FIG. 1.

Figure 3:
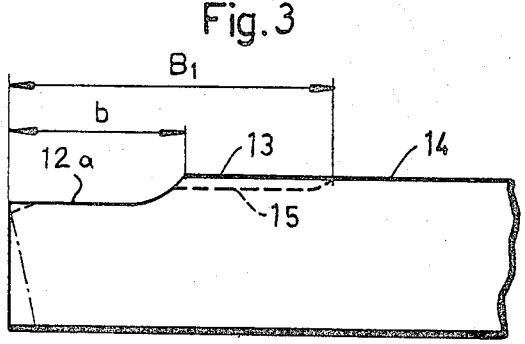

FIG. 3, a section on the line 3—3 in FIG. 1.

The insert 10 in FIG. 1 is triangular and has three cutting corners 12, with cutting edges 11 between the corners. Along the cutting edges there are chip breakers 16 forming depressions in the top surface of the insert, an island 14 being formed in the centre of the insert.

At the corners there are ridges 13 protruding from the central island 14 towards the corners 12. These ridges are directed along the bisector of the corner and terminate at a distance "b" from the edge of the corner.

The top of the ridge 13 may be level with the top surface of the island 14 or may lie somewhat below the island as indicated by the dashed line 15 in FIG. 3.

The portion 20 of the chip breaker 16 which lies close to the cutting edge may be horizontal or it may form a raised portion adjacent the edge as indicated by the dashed line 20a in FIG. 2. The rear land 21 of the chip breaker 16 is inclined upwards towards the island 14. The surface portion 12a between the ridge 13 and the cutting corner is flush with the surface 20 or 20a of the main chip breaker.

When the insert is used for rough machining the chip is wide and extends from the cutting corner along a substantial part of the cutting edge. The chip is broken by the main chip breaker 16.

When the insert is used for finishing, the cut has a small depth, and the width of the chip is small and covers only the rounded corner portion, the chip also being thinner than in rough machining. In order to break this thinner chip is required a chip breaker with a sharper bend and hence a smaller width. The ridge 13 provides such a secondary chip breaker, the width measured along the bisector being $b$ instead of $B_1$ (FIG. 1) in conventional inserts. In finishing, cutting the chip usually follows approximately the direction of the bisector of the corner, and hence the width $b$ is measured along said bisector. In rough cutting the chip is more perpendicular to the cutting edge, the width of the chip breaker being B.

The width $b$ of the secondary chip breaker should be at the most 0.8 of the width B of the main chip breaker, and usually less than 0.7B, and should be greater than 0.3B, usually greater than 0.4B. A suitable size of $b$ is about 0.5B.

In certain machining there may be a great cutting depth and a small feed, the chip being thin but broader than the finishing chip and thus, extending some distance along the cutting edge. For breaking also such chips, the main chip breaker may have two depressions 16a and 16b alongside the cutting edge separated by a ridge 22, indicated in FIG. 2 by a dashed line. The groove 16a, adjacent the cutting edge, breaks a thin and broad chip, while the groove 16b remote from the cutting edge breaks a roughing chip of normal thickness.

The insert according to the invention should be made of a hard material as a sintered carbide or a sintered ceramic material. The insert has suitably the shape of a regular polygon, often a triangle, each corner of which forms a cutting corner, the edges forming cutting edges, the insert being indexable for placing each of the cutting corners in cutting position. The insert may also be invertible, having cutting corners and edges on both sides.

I claim:

1. Cutting insert for chip cutting machining of metallic work pieces, said insert being adapted to be clamped in a tool and having at least one cutting corner and two cutting edges adjoining said corner, one on each side of said corner, said insert having a primary chip breaker extending along each of said cutting edges and forming a depression in the top surface of the insert, the insert further having a secondary chip breaker situated in said cutting corner and formed by a raised portion situated within the extension of the primary chip breaker above the level of the primary chip breaker and at a distance from the edge of said cutting corner and approximately along the bisector of the corner.

2. Cutting insert as defined in claim 1, having the main shape of a regular polygon, the sides of which form cutting edges and the corners of which form cutting corners, a primary chip breaker being provided in the form of a depression in the insert along each cutting edge, the center of the insert forming a raised island portion, raised ridges extending from said island towards the cutting corners terminating short of the cutting corners constituting secondary chip breakers.

3. Cutting insert as defined in claim 2, having the main shape of a regular triangle.

References Cited

UNITED STATES PATENTS

| | | | |
|---|---|---|---|
| 1,756,516 | 4/1930 | Klopstock | 29—95 |
| 3,137,917 | 6/1964 | Dowd | 29—95 |
| 3,187,406 | 6/1965 | Franko | 29—95 |

HARRISON L. HINSON, *Primary Examiner.*